Figure 1:
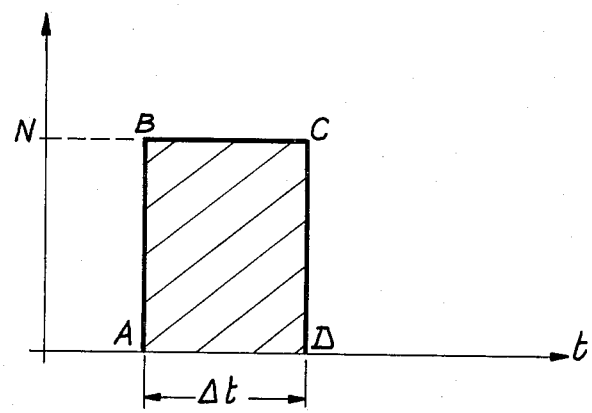

United States Patent [19]
Valentin et al.

[11] 3,920,420
[45] Nov. 18, 1975

[54] METHOD AND DEVICE FOR INJECTING LIQUID SAMPLES INTO A SYSTEM FOR CHROMATOGRAPHIC SEPARATION IN GAS PHASE

[75] Inventors: Patrick Valentin, Pont Eveque; Germain Hagenbach, Meyzieu, both of France

[73] Assignee: Entreprise De Recherches et D'Activities Petrolieres Elf, Paris, France

[22] Filed: Apr. 18, 1974

[21] Appl. No.: 462,060

[30] Foreign Application Priority Data
May 4, 1973 France .............................. 73.16247

[52] U.S. Cl. ............................. 55/67; 55/197
[51] Int. Cl.² ............................. B01D 15/08
[58] Field of Search ...................... 55/67, 197

[56] References Cited
UNITED STATES PATENTS

| | | |
|---|---|---|
| 3,352,089 | 11/1967 | Modell et al. .............................. 55/67 |
| 3,496,702 | 2/1970 | Canel et al. .............................. 55/67 |
| 3,511,029 | 5/1970 | Azamraca et al. .............................. 55/67 |
| 3,630,371 | 12/1971 | Hamina .............................. 55/67 X |
| 3,656,277 | 4/1972 | Slingerland .............................. 55/67 |
| 3,721,065 | 3/1973 | Robicheaux .............................. 55/67 |

*Primary Examiner*—John Adee
*Attorney, Agent, or Firm*—Sughrue, Rothwell, Mion, Zinn, & Macpeak

[57] ABSTRACT

A liquid sample is introduced into a vaporizer which is continuously swept with a carrier gas and connected to a chromatographic column. The liquid sample is supplied to the vaporizer via a pipe fitted with a valve such that the opening and then the closing of the valve permits injection of the requisite quantity of liquid sample at a predetermined rate. The method consists in carrying out at the end of injection a rapid purge of all the liquid contained in the pipe between the valve and the vaporizer and in carrying out a continuous purge of the pipe between injection periods.

7 Claims, 2 Drawing Figures

METHOD AND DEVICE FOR INJECTING LIQUID SAMPLES INTO A SYSTEM FOR CHROMATOGRAPHIC SEPARATION IN GAS PHASE

This invention relates to a method and a device for the injection of liquid samples into a system of chromatographic separation in gas phase. The invention is specially applicable to preparative chromatography installations comprising columns of large diameter.

Gas chromatography is a method of separation which consists in introducing a sample of the mixture to be separated or analyzed into a column filled with a selective stationary phase such as a solid adsorbent in the case of gas-solid chromatography or an inert solid impregnated with a liquid absorbent in the case of gas-liquid chromatography. A phase of this type will be designated hereinafter by the expression "stationary phase."

Under the action of the carrier gas, the sample progresses along the column and, depending on the affinity of the constituents of the mixture to be separated in the case of the solid or liquid stationary phase, said constituents migrate along the column at different rates, with the result that separation of these latter is obtained at the delivery end of the column.

The method of injection of the sample constitutes an important factor in the achievement of good separation in the chromatographic column and the highest efficiency is obtained when the sample is introduced in the "rectangular" form, that is to say when the curve of variation of concentration of the injected product as a function of time has the shape of a rectangle for the time-duration of the injection.

Briefly FIG. 1 graphically represents the sample injection and

Figure 2:
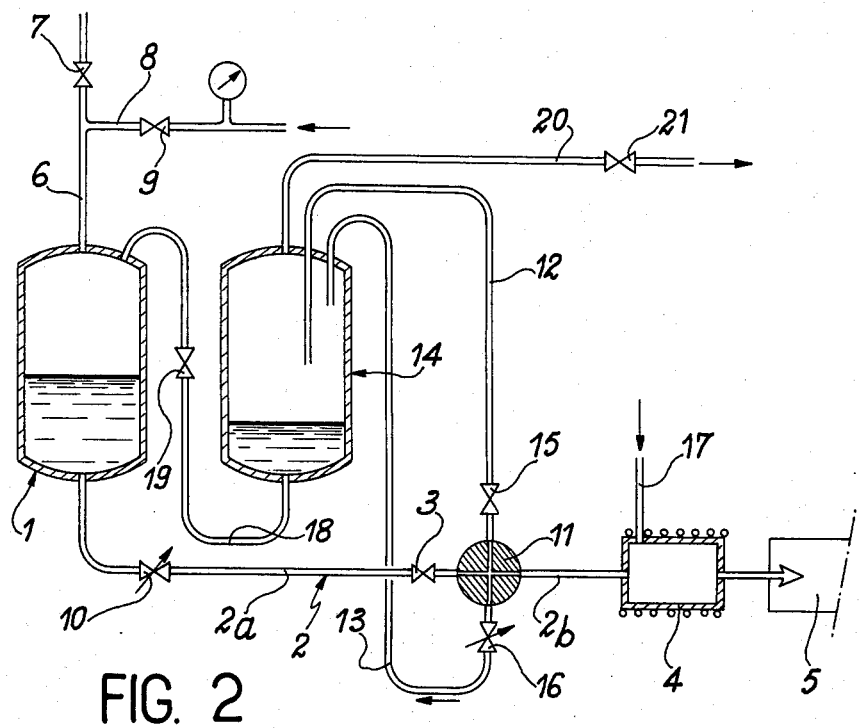

FIG. 2 illustrates the injection apparatus.

By way of illustration, FIG. 1 of the accompanying drawing is a graphical representation of this type of injection, in which time is plotted as abscissae and the concentration of the product injected into the carrier gas is plotted as ordinates. The curve ABCD of rectangular shape illustrates the injection performed during the time interval $\alpha t$.

Thus at the beginning of the injection, the level of concentration N of the injected product is attained instantaneously (portion AB), is maintained constant during the entire period of the injection (portion BC) and is restored to zero instantaneously at the end of the injection (portion CD).

By carrying out an injection of this known type, any streaks of the mixture to be separated which would disturb the equilibrium within the column between the phases present and which would result in poor resolution of the mixture to be separated are accordingly prevented from passing through the column either before or after the injection.

When the mixture to be separated is in liquid form, the usual technique consists in introducing said liquid into a vaporizer for the purpose of converting it into a gas which is then transported within the column under the driving force of the carrier gas. The injection is initiated by opening a valve placed in the pipe for supplying liquid to the vaporizer and the injection is brought to an end by closing said valve.

In most cases, this technique results in injections of non-rectangular shape caused by a small quantity of the product to be separated which passes through the column after the injection has stopped. This small quantity originates from the diffusion of molecules of the liquid which is trapped between the injection valve and the vaporizer and from the entrainment of said molecules within the column by the carrier gas after the end of the injection. Similarly, imperfect leak-tightness of the injection valve, especially when this latter is located at the vaporizer inlet and therefore subjected to high temperatures, is sometimes liable to permit traces of the mixture to be separated to pass into the chromatographic column after the end of the injection.

A method and apparatus for obtaining injections of rectangular form are described in U.S. Pat. No. 3,352,089. This method consists in carrying out preliminary vaporization of the liquid sample, in introducing it into a leak-tight chamber, then in injecting it into the column under the pressure of the carrier gas.

It is known that the evacuation of a chamber which contains a gas 1 by admission of a gas 2 at one end makes it possible to obtain at the exit of said chamber:
neither a rectangular variation of the concentration of the gas 1 in the gas 2 as a function of time,
nor expulsion of the pure gas 1.

In fact, the admission of a gas 2 into an enclosure which already contains a gas 1 results not only in expulsion of the gas 1 but also in mixing of the gas 2 with the gas 1 and correlatively in a slow decrease in the concentration of the gas 1 in the gas 2 at the chamber outlet.

The method described in U.S. Pat. No. 3,352,089 therefore does not make it possible to perform injections of rectangular form in a desirable manner, especially in preparative chromatographic installations.

Furthermore, the injection rate as well as the quantity of sample injected at each cycle are fixed at a given value which is directly related to the flow rate of carrier gas and to the volume of the leak-tight chamber by making use of the device disclosed in U.S. Pat. No. 3,352,089. These requirements reduce the possibilities of optimization of production in preparative chromatography since the rate of injection of solute and therefore the molar fraction of solute in the carrier gas at the point of entry into the column cannot therefore be established at values which are independent of the flow rate of carrier gas which passes continuously through the chromatographic column.

The present invention is directed to a method and a device for injecting liquid samples into a chromatographic separation system which overcome the various disadvantages mentioned above and serve to carry out injections of perfectly rectangular form.

The method is of the type in which the liquid sample is introduced in known manner into a vaporizer which is continuously swept with a carrier gas and connected to the chromatographic column, the liquid sample being supplied to the vaporizer by means of a pipe fitted with a valve such that the opening and then the closure of said valve permit injection of the requisite quantity of liquid sample at a predetermined rate. Said method essentially consists in carrying out at the end of injection a rapid purge of all the liquid contained in the pipe between the valve and the vaporizer and in carrying out a continuous purge of the pipe aforesaid between the injection periods.

In accordance with a further characteristic feature of the method which forms the subject of the invention, the rapid purge of the pipe aforesaid is carried out by passing therethrough for a limited period of time a large fraction of the carrier gas from the vaporizer to a recovery tank which is connected to said pipe.

In accordance with yet another characteristic feature of the method which forms the subject of the invention, a continuous purge of the pipe located between the injection valve and the vaporizer is performed outside the injection periods by diverting through said pipe a small fraction of the carrier gas derived from the vaporizer to a recovery tank which is connected to said pipe.

The device for carrying out the method according to the invention comprises in combination:
- a vaporizer which is continuously swept by a carrier gas and put into communication with a chromatographic column filled with a solid or liquid stationary phase;
- a pressurized tank containing the liquid to be injected;
- a main pipe for connecting said tank to said vaporizer, said pipe being fitted with an injection valve such that the opening and then the closure of said valve permit the transfer into the vaporizer of the quantity of liquid sample to be injected which is supplied from said tank;
- two secondary pipes opening into the main pipe at a point located between the injection valve and the vaporizer, each secondary pipe being intended to connect said main pipe to a common recovery tank;
- a valve which permits a high discharge and is placed in one of the secondary pipes, the immediate opening of said valve after closure of the valve located in the main pipe being intended to permit the flow of a large quantity of carrier gas from the vaporizer to the common recovery tank;
- a valve which permits a low discharge and is placed in the other secondary pipe, the opening of said valve being intended to permit the flow of a small quantity of carrier gas derived from the vaporizer towards the common recovery tank.

In accordance with the invention, the injection of a liquid sample into the chromatographic column is carried out by opening the injection valve whilst the valves placed in the secondary pipes are closed; the injection is stopped by closing said injection valve and immediately opening for a limited period of time the valve which permits a high discharge and is placed in one of the two secondary pipes. The valve which permits only a low discharge is left open outside the injection periods.

The different sweeps which are performed by the carrier gas either in a continuous or an intermittent manner in the different parts of the installation which are located in the vicinity of the injection valve and the vaporizer result in highly accurate control of the instants of beginning and end of injection of the liquid sample. This accordingly permits the practically instantaneous transition without streaks or parasitic effects from the state of injection of pure carrier gas to the state of injection of a mixture having a constant concentration of the sample which is vaporized in said gas. The injections of perfect rectangular type which are thus performed permit the application of a method of preparative chromatography with great ease and maximum efficiency even when making use of columns having substantial dimensions, for example in which the diameter of the column is of the order of several tens of centimeters.

The characteristic features of the invention will be more particularly brought out by the following description which is given by way of non-limitative example, reference being made to the accompanying drawings in which FIG. 2 is a schematic representation of the device according to the invention.

Said device comprises a tank 1 for supplying liquid to be injected, said tank being connected by means of the pipe 2 fitted with the injection valve 3 to the vaporizer 4 and to the chromatographic column 5. Said pipe 2 has a portion 2a located upstream of the valve 3 and a portion 2b located downstream of said valve. The liquid to be injected is first introduced into said tank 1 through a pipe 6 fitted with the valve 7 and pressurized within said tank by means of a gas supplied through the pipe 8 which is fitted with the valve 9. The pipe 2 which connects the liquid supply tank 1 to the vaporizer 4 is also fitted with a regulating valve 10 located upstream of the injection valve 3 and is provided at a point located between the injection valve 3 and the vaporizer 4 with a pipe-junction unit 11 from which extend the secondary pipes 12 and 13 for connecting said pipe 2 to the recovery tank 14. The pipe 12 is fitted with a rapid-opening valve 15 and the pipe 13 is fitted with a valve 16 which permits only small quantities of liquid to pass through. The vaporizer 4 is supplied continuously with carrier gas via the pipe 17.

The recovery tank 14 is connected by means of a pipe 18 fitted with a valve 19 to the liquid supply tank 1 and is also provided with a gas discharge pipe 20 fitted with the valve 21.

The mode of operation of said device will now be described. The injection of a liquid sample into the chromatographic column 5 is carried out in the following manner:

The column being continuously swept with the carrier gas derived from the vaporizer 4, and the liquid supply tank 1 being pressurized to a higher value than the pressure which exists at the inlet of the vaporizer, the injection valve 3 is opened whilst the valves 15 and 16 are closed. The liquid contained in the supply tank 1 is discharged through the pipe 2 at the flow rate established by the regulating valve 10 towards the vaporizer 4 in which said liquid is converted into gas and passes continuously in mixed flow with the carrier gas into the chromatographic column 5. When a sufficient quantity of said liquid has been introduced into the column, the injection is stopped by closing the injection valve 3 and immediately opening the valve 15. As a result of the opening of said valve 15, the liquid remaining within the pipe 2b located between the injection valve and the vaporizer 4 is immediately driven into the pipe 12 under the pressure of the carrier gas derived from the vaporizer. This results in rapid purging of said pipe 2b and the residual liquid displaced by the carrier gas flows into the recovery tank 14 in which the liquid and the gas are separated.

As soon as all the liquid contained in the pipe 2b has been drained-off, the valve 15 is closed and the valve 16 is opened, thereby initiating the flow within the pipe 13 of a small fraction of the carrier gas which is derived from the vaporizer 4. This small leakage flow of carrier gas through the pipe 13 entrains towards the recovery tank 14 any liquid charge which is liable to leak from the injection valve 3 during the period of elution by the carrier gas of the sample which has previously been introduced into the chromatographic column.

At the desired moment, the closure of the valve 16 and the opening of the injection valve 3 permit the introduction into the chromatographic column of a further liquid sample to be separated. The cycle of operations begins again as before.

In an alternative embodiment of the invention, the injection of a liquid sample into the column can also be carried out by leaving the valve 16 permanently open since the flow rate of liquid which is liable to escape from this latter is very small compared with the injection flow rate established by the regulating valve 10 which is placed in the pipe 2a.

The carrier gas which flows through the pipes 12 and 13 towards the recovery tank 14 can be withdrawn from said tank via the pipe 20 which is fitted with the valve 21 and used again in the system for supplying carrier gas to the vaporizer 4 after passing through a regeneration system.

Similarly, the liquid which is recovered in the tank 14 can be recycled into the supply tank 1 through the pipe 18.

What we claim is:

1. A method of injecting a liquid sample into a gas chromatographic column in a gas phase of the type including periodically supplying a predetermined quantity of the liquid sample to a vaporizing zone through a pipe from a valved control point, vaporizing the liquid sample in the vaporizing zone, mixing the vaporized sample with a carrier gas continuously sweeping the vaporizing zone and injecting the resulting mixture of vapor and carrier gas into the gas chromatographic column, with the improvements comprising rapidly purging the pipe up to the valved control point of all liquid after supplying the liquid sample to the vaporizing zone and continuously purging the pipe up to the valved control point during the periods that there is no liquid or vaporized sample in the vaporizing zone.

2. A method as in claim 1 wherein the rapid purging step is carried out by flow of carrier gas through the valved control point to a sample recovery zone.

3. A method as in claim 1 wherein the continuous purging is carried out by flow of a small fraction of the carrier gas through the valved control point to a sample recovery zone.

4. A method as in claim 1 wherein the steps of purging are carried out by flow of carrier gas through the pipe to a recovery zone and further comprising recovering samples purged to the recovery zone and recycling the same for injection.

5. Apparatus for injecting a liquid sample into a chromatographic column in a gas phase comprising in combination:

a vaporizer with means for continuously supplying a carrier gas thereto, the vaporizer being in fluid communication with a gas chromatographic column, a supply tank containing a liquid sample to be injected, a main pipe connecting the tank to the vaporizer, the main pipe containing an injection valve controlling transfer of the liquid sample to the vaporizer, two secondary pipes opening into the main pipe between the injection valve and the vaporizer at a point adjacent the injection valve, a valve in one of the secondary pipes quickly and fully operable when the injection valve is closed to allow rapid purging by the carrier gas of the main pipe between the vaporizer and injection valve, a restriction in the other secondary pipe allowing only a small quantity of carrier gas to flow through this secondary pipe from the vaporizer, and a recovery tank into which the other end of the secondary pipes connect.

6. Apparatus as in claim 5 further comprising a valved connecting pipe between the recovery tank and supply tank.

7. Apparatus as in claim 5 wherein the restriction is a valve which permits low flow of the carrier gas.

* * * * *